US00RE50837E

(19) United States
(12) Reissued Patent
Mohaideen Pathurudeen et al.

(10) Patent Number: US RE50,837 E
(45) Date of Reissued Patent: Mar. 17, 2026

(54) OFFLINE METHOD TO DETERMINE LOCATION OF A VEHICLE USING MOBILE PHONES

(71) Applicant: Google LLC, Mountain View, CA (US)

(72) Inventors: Ahmed Nizam Mohaideen Pathurudeen, Bangalore (IN); Sashikumar Venkataraman, Bangalore (IN); Meenakshi Sundaram, Madurai (IN); Balasubramoniam Rajendran Suriyakala, Nagercoil (IN); Arun Kumar Nagarajan, Nagercoil (IN)

(73) Assignee: GOOGLE LLC, Mountain View, CA (US)

(21) Appl. No.: 18/384,297

(22) Filed: Oct. 26, 2023

Related U.S. Patent Documents

Reissue of:
(64) Patent No.: 11,159,915
Issued: Oct. 26, 2021
Appl. No.: 16/983,000
PCT Filed: Feb. 20, 2019
PCT No.: PCT/IB2019/051375
§ 371 (c)(1),
(2) Date: Sep. 21, 2020
PCT Pub. No.: WO2019/180517
PCT Pub. Date: Sep. 26, 2019

(30) Foreign Application Priority Data

Mar. 21, 2018 (IN) ..... 201841010407

(51) Int. Cl.
*H04W 4/02* (2018.01)
*G01S 5/02* (2010.01)
(Continued)

(52) U.S. Cl.
CPC ..... *H04W 4/029* (2018.02); *G01S 5/02695* (2020.05); *G01S 5/0295* (2020.05); *H04W 4/023* (2013.01); *H04W 84/042* (2013.01)

(58) Field of Classification Search
CPC ..... H04W 4/029; H04W 4/023
See application file for complete search history.

(56) References Cited

U.S. PATENT DOCUMENTS 7,383,043 B2 6/2008 Lee
8,150,417 B2 * 4/2012 Reed ..... G01S 5/017 342/450
(Continued)

FOREIGN PATENT DOCUMENTS

CN 104598528 5/2015
CN 106558232 4/2017
(Continued)

OTHER PUBLICATIONS

International Search Report and Written Opinion for Application No. PCT/IB2019/0151375, mailed May 21, 2019, 9 pages.
(Continued)

*Primary Examiner* — Angela M Lie
(74) *Attorney, Agent, or Firm* — DORITY & MANNING P.A.

(57) ABSTRACT

The present invention provides a method for determining real-time location of a vehicle using a mobile device without GPS for the user travelling inside the vehicle. According to the embodiment of the present invention, the location of the vehicle is determined using the locations of the cell-towers to which a mobile phone of a user is connected, and projects these cell tower locations onto the selected route of the user journey to obtain a closest point and thereby determining the user location. The invention also provides the real-time location of the vehicle over internet to users outside the vehicle by crowd-sourcing the cell-tower data of the passengers inside the vehicle.

20 Claims, 11 Drawing Sheets

(51) Int. Cl.
*H04W 4/029* (2018.01)
*H04W 84/04* (2009.01)

(56) References Cited

U.S. PATENT DOCUMENTS 8,350,758 B1 * 1/2013 Parvizi ..... G01S 5/02526 342/464
8,699,943 B2 4/2014 Kummetz et al.
9,420,453 B2 8/2016 Casey
2004/0043774 A1 * 3/2004 Lee ..... H04W 64/00 455/456.1
2009/0106778 A1 * 4/2009 Pomeroy ..... H04W 4/029 719/328
2010/0323723 A1 * 12/2010 Gerstenberger ..... G01S 5/0226 455/456.5
2011/0012781 A1 * 1/2011 Ronald ..... G01S 5/0226 342/386
2012/0170560 A1 7/2012 Han et al.
2012/0220308 A1 * 8/2012 Ledlie ..... H04W 4/029 455/456.1
2013/0162481 A1 * 6/2013 Parvizi ..... G01S 5/02524 342/452
2013/0217414 A1 8/2013 Nagaraj
2013/0237204 A1 * 9/2013 Buck ..... G01S 19/16 455/418
2015/0168174 A1 * 6/2015 Abramson ..... G01C 21/3484 701/408
2015/0241231 A1 * 8/2015 Abramson ..... G01C 21/3446 701/534

FOREIGN PATENT DOCUMENTS

WO WO 2005115040 12/2005
WO WO-2011008206 A1 * 1/2011 ..... G01S 5/0246
WO WO-2012176022 A1 * 12/2012 ..... G01S 5/0027

OTHER PUBLICATIONS

International Search Report and Written Opinion for Application No. PCT/IB2019/051375, dated May 21, 2019, 9 pages.

* cited by examiner

| Stations along route | Arrival Time | Departure Time | Is stopping Station? | Latitude | Longitude |
|---|---|---|---|---|---|
| s1 | 7:10 am | 7:12 am | Yes | 26.88 | 80.97 |
| s2 | 7:25 am | 7:30 am | Yes | 26.92 | 81.2 |
| s3 | 7:48 am | 7:48 am | No | 26.84 | 81.41 |
| s4 | 8:02 am | 8:14 am | Yes | 26.95 | 81.45 |

Fig. 4(a)

| Stations along route | Arrival Time | Departure Time | Is stopping Station? | Latitude | Longitude |
|---|---|---|---|---|---|
| s1 | 9:20 am | 9:22 am | Yes | 26.88 | 80.97 |
| s2 | 9:35 am | 9:40 am | Yes | 26.92 | 81.2 |
| s3 | 9:58 am | 9:58 am | No | 26.84 | 81.41 |
| s4 | 10:12 am | 10:24 am | Yes | 26.95 | 81.45 |

Fig. 4(b)

| Stations along route | Arrival Time | Departure Time | Is stopping Station? | Latitude | Longitude |
|---|---|---|---|---|---|
| s1 | 10:20 am | 10:22 am | Yes | 26.88 | 80.97 |
| s2 | 10:45 am | 10:50 am | Yes | 26.92 | 81.2 |
| s3 | 11:07 am | 11:09 am | No | 26.84 | 81.41 |
| s5 | 11:32 am | 11:39 am | Yes | 26.98 | 81.65 |

Fig. 4(c)

| Stations | Latitude | Longitude |
|---|---|---|
| s1 | 26.88 | 80.97 |
| s2 | 26.92 | 81.2 |
| s3 | 26.84 | 81.41 |
| s4 | 26.95 | 81.45 |
| s5 | 26.98 | 81.65 |

Fig. 5

| Cell Towers | Latitude | Longitude |
|---|---|---|
| c1 | 26.88 | 80.97 |
| c2 | 26.92 | 81.2 |
| c3 | 26.84 | 81.41 |
| c4 | 26.95 | 81.45 |
| c5 | 26.98 | 81.65 |

Fig. 6

OFFLINE METHOD TO DETERMINE LOCATION OF A VEHICLE USING MOBILE PHONES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATIONS*

*This application is a broadening reissue of U.S. Pat. No. 11,159,915 (previously U.S. patent application Ser. No. 16/983,000, filed Sep. 21, 2020), which is based upon and claims the right of priority under 35 U.S.C. § 371 to International Application No. PCT/IN2019/051375 filed on Feb. 20, 2019, which claims the priority benefit of Indian Patent Application No. 201841010407 filed on Mar. 21, 2018. Applicant claims priority to and the benefit of each of the above-identified applications and incorporates all such applications herein by reference in their entirety for all purposes.*

FIELD OF INVENTION

The embodiments herein generally relates to a method and system of finding approximate location of a vehicle for a user using his/her mobile device. The invention is specifically applicable when a user travels in public transport where the set of routes and schedules are publicly known, and the user would like to view the dynamic location of a vehicle with or without the need of Internet.

BACKGROUND AND PRIOR ART

Passengers travelling in public transports have great tendency to frequently know the location of the vehicle with respect to the journey. In many countries, the exact location of the vehicle is not displayed to the passengers in the vehicle. Furthermore, in many countries like India, the public transport like trains and buses have overnight journeys, which makes it more difficult for the passenger to determine the current location of the vehicle in a journey. Moreover, these vehicles also get often delayed and don't run as per the known schedule which makes it even more important for passengers to know real-time location of the vehicle and plan accordingly.

Mobile phone based solutions are very attractive since most people nowadays carry smart-phones and use them as the main device for several services. In the area of finding locations, mobile phones have enormously helped in the past since they also usually come with location-based services that enable a user to determine the location accurately. In conventional approaches, location is found using GPS (global positional system). It is well known that GPS based co-ordinates are quite accurate (within 10 meters) and has been used effectively for turn-by-turn navigation. However, in mobile phones, GPS based solutions do come with a cost. They need lot of power and drain the battery very fast. This is because GPS is a very slow communication channel. It need to communicate with 3 or 4 satellites for an extended duration at nearly 50 bits per second that puts a huge load on the battery life of the mobile phone and particularly when a user is in a long-distance public transport where battery charge is vital, it is not viable to use GPS continuously to monitor location. The other problem with GPS solutions is relating to the locking of the GPS signal. This part takes several seconds and sometimes even fails from specific locations in closed environments inside the vehicle.

The main advantage of a GPS system to track location is the accuracy. It is possible to build a turn-by-turn navigation system purely using GPS due to the high accuracy possible. However, in many modes of transport such as public transport, it is not necessary turn-by-turn direction since the user is just a passenger and not driving the vehicle. Furthermore, the journey route is known upfront and only an approximate location along the route is usually needed. For example, in the context of trains, one needs to know the previous station, the next station and the rough location of the train between these two stations. In fact, an accuracy of 1-2 kms is also acceptable in this case since the train itself is quite big in the order of several hundred meters. But what is more important is to enable this with minimal battery overhead so that users are able to use this solution along long journeys.

Internet-based solutions is yet another alternative to find the dynamic information of public transport. In this approach, the user mobile phone or an application in the user's mobile phone gets connected to a specific website during travel, and the website provides the latest information of the specific vehicle. Such websites are common in many developed countries which have specific websites for tracking each public mode of transport. However, this method too has several limitations. This assumes a high reliance up-to-date website that carries information of all public transport that will also need to update real-time to handle delays. However, the bigger problem with this approach is the availability of a live internet connection on the mobile phone, which is often not feasible due to several reasons. Firstly, the area traversed by the vehicle may not have good internet connectivity, which is quite common in remote locations or lesser-developed nations. Secondly, this approach also puts a high load on the battery life since the mobile phones have to do the work of transferring data to and fro the cell towers. Lastly and more importantly, there is usually no reliable website in the internet that may provide the accurate real-time location for the particular vehicle that the user is travelling.

Therefore, there is a need to develop a technique that enables users to find the location of the vehicle using mobile devices without the overhead of GPS or internet especially during commuting in public transport. One object of the present invention is to provide such a technique that works offline and enables users commuting inside a vehicle to determine the approximate location of the vehicle without the need of internet or GPS. This technique is expected to be very battery friendly with minimal overhead and hence would be suitable across long journeys. Another object of the invention is to dynamically render this approximate location along the route traversed by the vehicle without needing Internet or GPS. Yet another object of the invention is to estimate the delay information of the vehicle along the journey from the scheduled time, and render this information along the route, again without needing Internet or GPS.

Though the above offline method provides the real-time location of the vehicle for a passenger inside a vehicle without needing Internet or GPS, it does not work if a person is outside the vehicle and still wants to find the real-time location of that vehicle. This is especially needed by passengers before boarding the vehicle or for persons who are not travelling but may still interested to know the real-time location of that vehicle. In such scenarios, the user will need an internet so as to connect to a website that can provide the real-time location of the specific vehicle. One of the object of the invention is also to provide the real-time location of a set of known public vehicles over internet by crowd-sourcing the data of the passengers inside the corresponding vehicles.

SUMMARY OF THE INVENTION

In view of the foregoing, an embodiment herein provides the user travelling the ability to choose a specific vehicle in a public transport system and a way to specify whether the user is inside or outside the vehicle. The method and system used in the invention stores the route information for a predetermined set of vehicles in the mobile device so that they are available offline during travel without needing Internet. The route information of a vehicle consists of the geographical path traversed by the vehicle along with the times at which the vehicle arrives/departs specific points along the route. For public transport like trains/buses, the route information for each individual train/bus is publicly known in a specific website or database. Though the route information may also change over time, they change at a frequency of several days. The method and system used in the invention is able to update the mobile phone with the latest route information, and this is done intelligently at times when the user is not travelling and when the mobile phone is connected to Internet. The method and system used in the invention further converts the publicly known route information into a form that enables efficient projection of a cell tower location into any desired route.

Another embodiment of the invention provides a method and system for determining the location of the user inside a vehicle using the locations of the cell-towers to which a mobile phone of a user is connected, and projects these cell tower locations onto the selected route of the user journey to estimate the location of the user. As the user moves along the specified route, the mobile gets connected to different cell-towers, and the positions of these towers get dynamically projected on the specified route and displayed appropriately to the user. A crucial part of the invention is to achieve this scheme offline without needing internet or GPS by storing all the relevant data needed within the mobile phone of the user. This is done by storing the locations of all the cell-towers relevant for the user within the mobile device. Though it may be infeasible to store all the locations of the entire cell-tower database in a mobile phone, it is possible to optimally determine a small fraction of cell-towers based on the user's home location and areas frequently travelled and download that information into the mobile.

The method and system used in the invention listens continuously to the cell-tower to which the mobile phone is connected. The cell-tower information is received in the form of an identifier (cell tower-id), and the corresponding cell-tower location is determined by mapping the received cell tower id with the locations of the relevant cell towers stored locally on the mobile device. Typically, the mobile phone connects to a cell-tower within a radius of 0-5 kms around mobile phone. This distance varies based on the density of towers around the route. The connected cell-tower location is then projected geometrically on the route and displayed visually on the mobile device and then determines the location of the user. The determination of the location of the user includes linear line approximation of the route selected by the user, projection of the location of the connected cell tower onto the selected route and determining the location of the user by using the closest point and is rendered visually on top of the route. The determination of the location of the user further includes determination of the distance of the closest point in the selected route from the connected cell tower and the determined distance is compared with a pre-determined range, wherein the pre-determined range is 5 kms. When the distance is within the pre-determined range the cell tower appears near to the closest point and the cell tower projects onto the selected route and thereby estimates the location of the user. When the distance exceeds the pre-determined range the cell tower founds to be far from the closest point and thereby connects the mobile device to another cell tower. As the cell-towers connected to the mobile phone changes, this projected point keeps changing and is dynamically updated on the route. This simulates the journey for the user in the same manner as GPS shows live location on maps; but without the overhead of battery consumption and working completely offline.

In another embodiment of the invention, the route information is used along with the predicted user location to predict delay if applicable along with the expected time for the vehicle to reach specific points along the route such as the final user destination. This delay information is also dynamic as it changes with time for different user locations, and may be additionally rendered on the route graph along with the predicted user location.

Another embodiment of the invention provides a method for providing the real-time location of a vehicle for a person outside the vehicle via internet by crowd-sourcing the cell-tower information from users travelling inside the vehicle. This includes automatically uploading a list of all the cell tower information to a central server from the passengers travelling inside the vehicle whenever possible, and synthesizing the collective information of one or more users to provide the real-time location of the vehicle over internet. The cell tower information includes the cell tower-id of a tower that the user was connected along with the timestamp when the particular cell-tower was encountered. The central server then resolves the latitude and longitude information of these cell towers and converts the list of cell tower information from each user to a positional data series at specific times. The central server then uses such positional data series from one or more users to determine the real-time location of a given vehicle over internet.

BRIEF DESCRIPTION OF DRAWINGS

The detailed description is set forth with reference to the accompanying figures. In the figures, the left-most digit (s) of a reference number identifies the figure in which the reference number first appears. The use of the same reference numbers in different figures indicates similar or identical items.

FIG. 4(a) illustrates an example of a route information for a particular vehicle in a public transport system, according to an embodiment of the present invention herein;

FIG. 4(b) illustrates an example of a route and schedule information for a particular vehicle that has the same stations of the route shown in FIG. 4(a) but has different arrival and departure times, according to an embodiment of the present invention;

FIG. 4(c) illustrates an example of a route information for a particular vehicle that shares majority of the stations of the route shown in FIG. 4(a), according to the embodiment of the present invention.

FIG. 5 illustrates an example of the location information for the stations along the route stored together consisting of latitude and longitude information, according to an embodiment of the present invention herein;

FIG. 6 illustrates an example of the location information of the cell towers in a form of a table, according to an embodiment of the present invention herein;

DETAILED DESCRIPTION OF THE PREFERRED EMBODIMENTS

Figure 1:
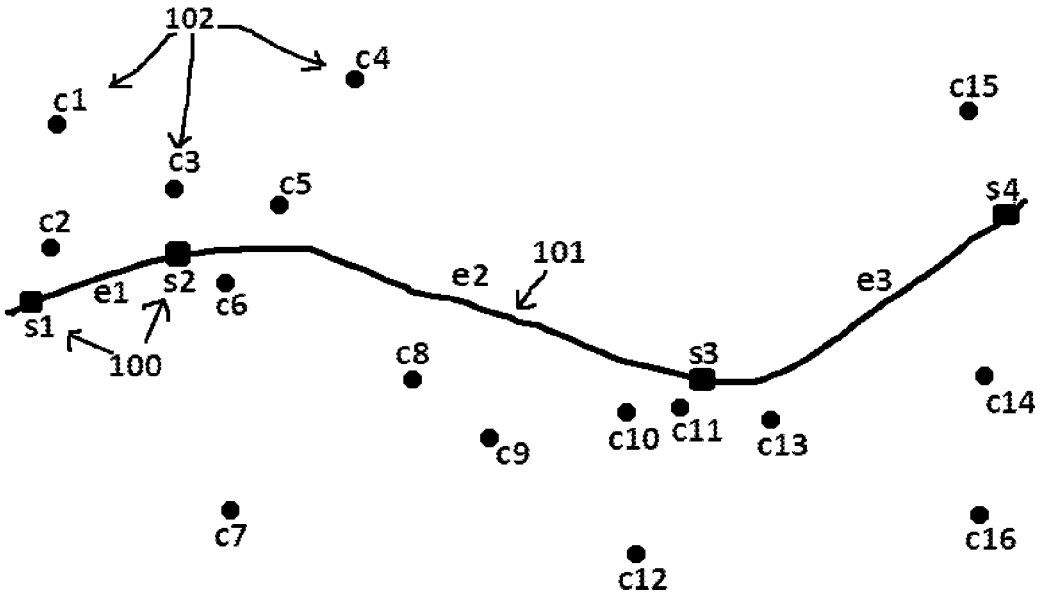
FIG. 1 illustrates the placement of cell towers around a route travelled by a user, according to an embodiment of the present invention herein.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to develop a technique that enables users inside a vehicle to find the location of the vehicle using mobile devices without the overhead of GPS or internet especially during commuting in public transport. The embodiments herein achieve this by locating cell towers around the route of the vehicle selected by the user and using these locations to estimate the real-time location of the vehicle. Referring now to the drawings, and more particularly to FIG. 1 through FIG. 9, where similar reference characters denote corresponding features consistently throughout the figures, there are shown preferred embodiments.

According to an embodiment of the present invention, the method for determining the real-time location of the vehicle for a user travelling inside the vehicle along comprises of: collecting and storing the route information of a plurality of vehicles inside the mobile device, and further collecting and storing plurality of relevant cell towers along with their respective locations in the mobile device; wherein the relevant cell towers includes the cell towers along the route of user's home location and frequently travelled areas, the user selecting manually or automatically a vehicle in which the user is travelling using the mobile device; wherein the mobile device is connected to any one of the cell tower available in the route of the selected vehicle, receiving information of the connected cell tower in the form of a cell tower-id, determining the location of the connected cell tower by mapping the received cell tower-id with the stored location of the relevant cell towers, projecting the location of the connected cell tower onto the route of the selected vehicle, and thereby determining the real-time location of the vehicle based on the location of the connected cell tower and visually displaying the location of the vehicle along with the route on the mobile device.

According to an embodiment of the present invention, the determination of the location of the cell tower includes an approximation of the route of the selected vehicle as a connected set of linear lines, projecting the location of the connected cell tower on to the route to obtain a closest point and determining the user location using the obtained closest point. According to an embodiment of the present invention, the determination of the location of the user further includes finding the distance of the closest point in the route from the connected cell tower and comparing the distance within a pre-determined threshold value which could be between 2 to 10 kms based on the desired accuracy. When the distance is within the threshold value, the cell tower is concluded to be near to the route and the closest point is used to estimate the location of the vehicle. When the distance exceeds the threshold value, the cell tower is deemed to be far from the closest point and thereby connects the mobile device to another cell tower.

FIG. 1 illustrates an example of portion of a route of a public transport system with the set of cell towers around the specific route, according to the present invention. In an embodiment, a route consists of sequential set of stations 100 connected to each other via edges 101. In FIG. 1, s1, s2, s3 and s4 are the stations in a route and they are connected to each other via edges e1, e2 and e3 that denote the journey path of the public transport vehicle. The cell towers that are around the route 102 are shown as black dots in the figure. These consist of c1, c2, c3, . . . c16. It is seen that the cell tower densities are usually higher around the stations where there is higher density of population. Each cell tower further has location information that consists of the latitude and longitude of the position where the cell tower is located.

Figure 2:
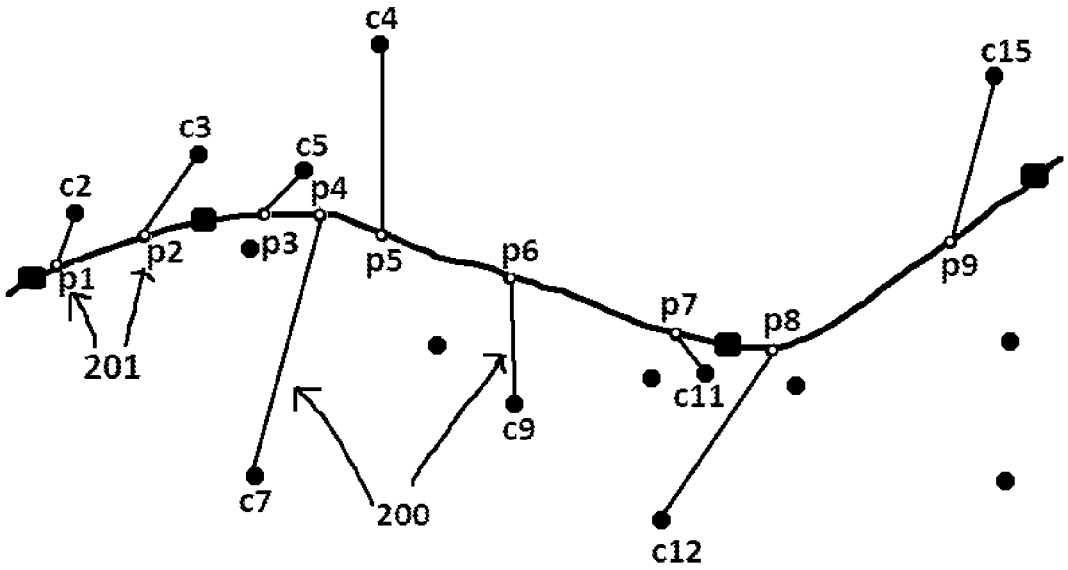
FIG. 2 illustrates connection of the mobile device of a user to the cell-towers as time progresses, according to an embodiment of the present invention herein.

FIG. 2 illustrates an example of a user travelling on the same route as FIG. 1 showing the various cell towers that gets connected to the user's mobile phone as the user travels in this route, according to the present invention. These connections are shown in 200 in the figure. The positions of the user at the times when the cell tower switching happens are shown in 201. At time t1, the user is at position p1 and the phone gets connected to cell tower c2. The mobile phone then connects to cell tower c3 at time t2 when the user is at position p2, then cell tower c5 at time t3 from position p3, cell tower c7 at time t4 from position p4, and so on. The cell tower that gets picked by the mobile phone depends on several conditions such as signal strength of the tower, distance of the tower from the track, and the operator network of the mobile phone and the cell tower. However, the main parameter that governs this choice is usually the distance of the tower from the mobile phone and it is more likely for the mobile phone to connect to towers that are closer.

Figure 3:
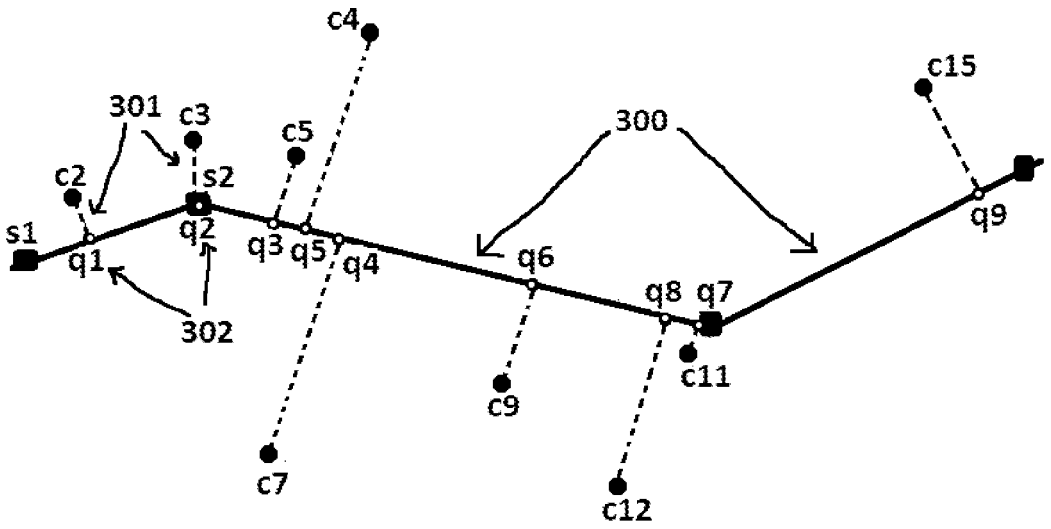
FIG. 3 illustrates the estimation of the user location at a particular time along the route, according to an embodiment of the present invention herein.

In a preferred embodiment of the invention, the user locations p1, p2, p3, . . . are not known and are estimated based on the cell towers as the user travels in the route. FIG. 3 illustrates the estimation of the user location using the location of the cell towers, according to an embodiment of the present invention. In this Figure, the same route of the user is first approximated using linear lines joining the stations as shown in 300. The linear line approximation of the routes enable to compactly store a large number of routes in the mobile phone using a small storage space. On this linearly approximated route, the location of the cell tower to which the mobile phone is connected is projected as shown in 301. This projected location shown in 302 is then used to estimate the user location. In this Figure, the user is at position p1 at time t1 and the mobile phone is connected to cell-tower c2. The location of cell tower c2 is projected to the route to get a point q1. This projection is done on the straight line joining the stations s1 and s2 since that is the closest edge of the route to the cell tower c2. In an embodiment of the invention, this projected point, q2, is used to estimate the user location at time t1 and rendered visually to the user.

FIG. 4a illustrates route information of a vehicle in a public transport system in a form of table where each row corresponds to the information relating to a specific point or station in that route and edges of the route are between stations in consecutive rows of the table, according to an embodiment of the present invention. Each station is associated with an arrival time when the vehicle arrives at that station, and a departure time when the vehicle departs that station. Each station is also associated with the information whether the vehicle stops for a finite duration in that station or just passes that station without stopping. Each station further has associated location information consisting of latitude and longitude.

In a preferred embodiment of the present invention, plurality of route information needs to be stored in the mobile device. In yet another preferred embodiment of the invention, two or more the routes share common stations along the corresponding routes. FIG. 4b illustrates a route that has the same stations of the route shown in FIG. 4a but has different arrival and departure times, according to an embodiment of the present invention. FIG. 4c illustrates yet another route that shares some, but not all, of the stations with the route shown in FIG. 4a, according to an embodiment of the present invention. In FIG. 4c, stations s1, s2 and s3 are common with the route shown in FIG. 4a whereas s4 and s5 are not. Such fully or partially overlapping of stations between routes occur frequently in public transport and storing the same location information of the stations in the context of different routes causes a large amount of memory usage in the mobile device. Instead of storing the location information for the stations with each route, the method and system used in the invention stores a single instance of the location information for each station. FIG. 5 illustrates a table where all the location information of the stations are stored together and separate from the individual route information, according to the embodiment of the present invention. This enables a more compact storage of a large number of routes in the mobile phone and consuming low memory.

In a preferred embodiment of the present invention, the location information of two or more routes stored is converted to another data structure to enable efficient finding of the closest position on a given route from any arbitrary position. Several such data structures are known to exist in the practicing art such as k-d trees or quad trees. In one embodiment of the invention, the stations corresponding to each route are stored in individual k-d trees, and the closest point to a given route from an arbitrary position is found using by querying the corresponding k-d tree associated with the route. In another embodiment of the invention, the stations corresponding to two or more routes are stored in a single k-d tree, and the closest point to a given route from an arbitrary position is found using by querying the single k-d tree.

FIG. 6 illustrates the location information of cell towers in a form of a table where each row contains a cell-tower identifier with a corresponding latitude and longitude, according to the embodiment of the present invention. In a preferred embodiment of the invention, the location information of the cell towers are stored in the mobile device so that it is possible to retrieve this information without needing Internet. Several ways are known to exist for storing such information in the mobile device. In one embodiment of the invention, the location information of a set of cell towers are stored in a database in the mobile phone, and the location of a particular cell tower is retrieved by querying the database using the cell tower identifier. In another embodiment of the invention, the location information of the cell towers are stored in a file in the mobile phone, and the location of a particular cell tower is retrieved by searching the file for the corresponding cell tower identifier and retrieving the corresponding location information.

Figure 7:
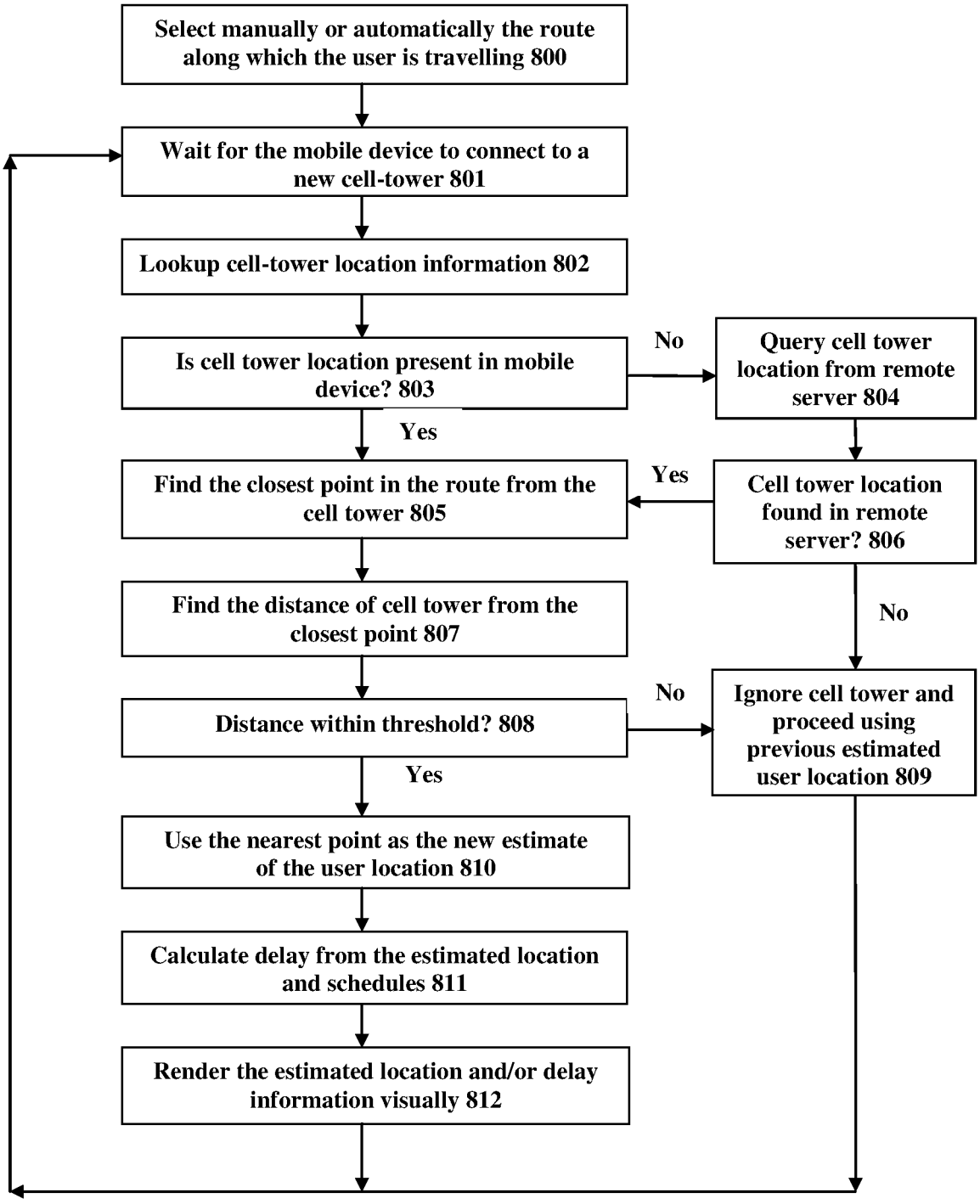
FIG. 7 illustrates a flowchart diagram of the method and system of the invention of using the user location and route information to predict delay information, according to an embodiment of the present invention herein.

FIG. 7 illustrates a flowchart diagram of the method and system of the invention of finding the real-time location of the vehicle, according to an embodiment of the invention. In step 800, the user selects the vehicle in which he/she is travelling using a suitable interface. In one embodiment of the invention, the vehicle is selected using a vehicle identifier. In yet another embodiment, the vehicle is selected by first searching for all vehicles between a start station and end station and then selecting the particular vehicle. In the next step 801, the system starts listening to any change in the cell tower to which the mobile device is connected. In one embodiment of the invention, the change in cell tower is detected by the operating system of the mobile phone and intimates the application of the change with the cell tower identifier. Once a cell tower is connected, the method and system used in the invention receives information of the connected cell tower in the form of a cell tower-id and tries to get the location of the cell tower (step 802) using the cell tower identifier. In a preferred embodiment of the invention, the locations of one or more cell towers are stored in the mobile device and the location of the cell tower is determined by mapping this set of stored locations of the relevant cell towers stored locally in the device. If the particular cell tower location is not found in the mobile device, the method and system used in the invention optionally queries the remote server using the cell tower identifier for the desired location (step 804). If the location of the cell-tower is not resolved, then that cell-tower is ignored and the invention continues to wait for another cell tower. Once the location of connected cell tower is determined, the method used in the invention proceeds to step 805 where the connected cell tower location is projected onto the route of the vehicle in step 800. In one embodiment of the invention, binary search trees like k-d trees are used to determine the closest point from the route of the vehicle. Once a closest point is obtained, the distance of the closest point is obtained from the connected cell tower location (step 807). If the distance exceeds a pre-determined threshold value (step 808) (which could be around 5 kms), then the connected cell tower is concluded to be far from the selected route and hence cannot be used to estimate the vehicle location. In such a case (step 809), the connected cell tower is ignored and the method and system used in the invention continues to wait for another cell tower (step 801). However, if the distance is within the pre-determined threshold value, then it is concluded that the connected cell tower is near the route and the projected point can be used to estimate the real-time vehicle location (step 810). In a preferred embodiment of the invention, the route information of one or more vehicles is stored locally in the mobile device. This route information includes the arrival and departure time from all the stations along the route. Using this information and the estimated vehicle location, a delay is predicted that estimates how much slower the particular vehicle is running along that route (step 811). The new estimated vehicle location and delay information are rendered back in a suitable interface along with the route back to the user (step 812). After rendering the newly predicted location and delay, the method and system used in the invention again starts waiting for a cell tower change and loops back to step 801.

Figure 8:
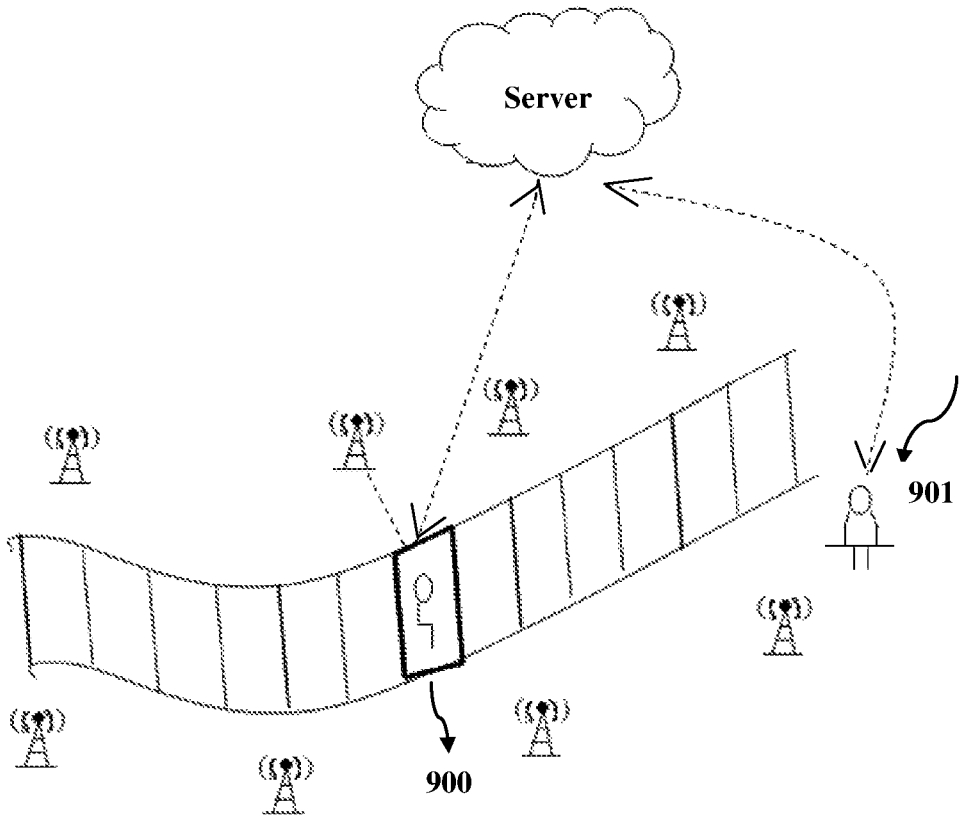
FIG. 8 illustrates an exemplary model of the users inside the vehicle uploading data to cloud servers which does the crowd-source and caters to the users outside the vehicle, according to an embodiment of the present invention herein.

FIG. 8 illustrates an exemplary model of the users inside the vehicle uploading cell-tower data to central servers which does the crowd-source and provides the real-time location of the vehicle to users outside the vehicle, according to an embodiment of the present invention. The method of providing real time location of a vehicle to the people outside 901 includes automatically uploading a list of connected cell tower information by the users inside the vehicle 900 to a central server, wherein the cell tower information includes cell tower id and timestamp when the user has encountered that tower. The central server resolves the latitude-longitude information for each tower, and thereby converts the cell tower information of each user to a positional time series data.

Figure 9:
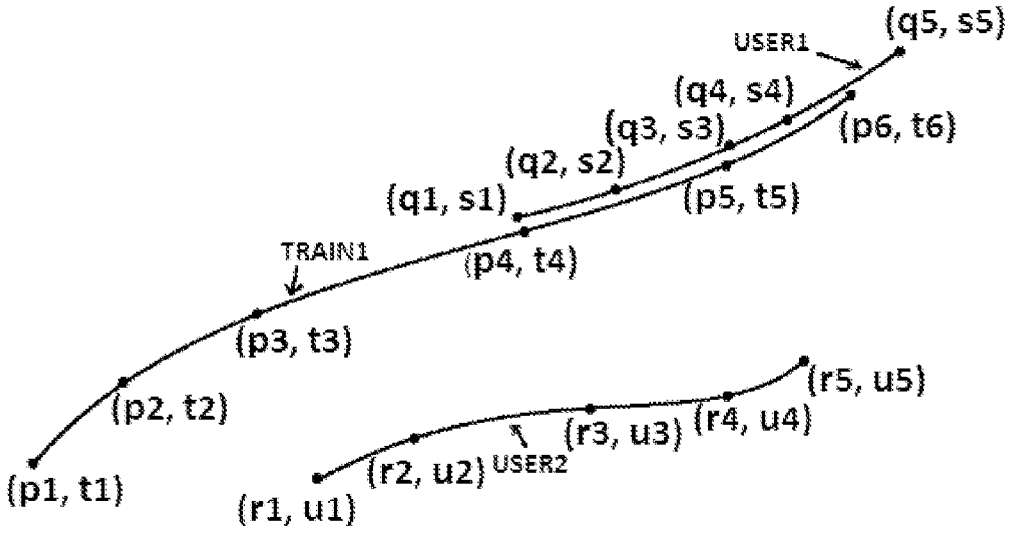
FIG. 9 illustrates an exemplary model of a positional-time series data for a vehicle and positional time series data of 2 users, according to an embodiment of the present invention herein.

According to an embodiment, each vehicle is visualized as a list of multiple positions in the form of latitude and longitude at one or more point in time, and is another positional time series data. FIG. 9 illustrates an exemplary model of a positional time series data for a vehicle at different times, and a positional time series data of 2 users.

With each vehicle, the server further maintains a list of candidate users that could potentially be travelling in that vehicle. These candidate users for a vehicle can be determined based on several clues such as the user explicitly mentioning via a suitable interface that he/she is traveling inside that vehicle or when the user is known to have a booking in the vehicle or when the user does a real time status of the vehicle. Not all candidate users of a vehicle are inside the vehicle, since even if a user selected to be inside the vehicle, the particular user may not be truly inside the vehicle.

The positional time series data of the vehicle is compared with the positional time series data of each candidate user, and if they match closely then the user is classified to be inside the vehicle. So in the example enclosed in the FIG. 9, the vehicle is shown as a series of positions p1, p2, p3, . . . p6 at times t1, t2, t3 . . . t6. Similarly User1 and User2 are shown as series of positions at different times based on when the users encountered those cell-towers. In this example, the positional time series data of User1 overlaps with the vehicle for a reasonable portion of time, and hence it is concluded that User1 is inside the vehicle. So the position q5 at time s5 of User1 is used to extend the series of the vehicle and hence (q5, s5) is added to the positional time series data of the vehicle. However, the positional time series data of User2 does not match with the vehicle and User2 is determined not to be inside the vehicle, and hence cannot used to extend the vehicle's real-time data.

In FIG. 9, if a user is determined to be inside a vehicle, then the positional time series data series of the vehicle is extended with the positional time series data of the user to get a more live real time location of the vehicle. So in the above example, q5 is a new position generated for the vehicle at time s5 and is the new real-time location of the vehicle. This scheme hence continuously generates fresh live-status of the vehicle as long as there are one more users travelling in the vehicle and are able to upload their cell-tower information to the central server.

FIG. 9 shows the update of real-time location of a vehicle based on one or more users travelling inside the vehicle when there already exists positional data for the vehicle till a prior point in time. When there is no positional data available for a vehicle, this has to be generated using a plurality of users travelling inside the vehicle. In such a situation, a single user may not be sufficient to create the real-time positional data of the vehicle and a plurality of more than one user is used to create the real-time position of the vehicle.

According to an embodiment, above said crowd-sourcing of the user data is only based on uploads coming from the user whenever they access the real-time vehicle location within the system. However, many times users check the vehicle status before or at the beginning of the journey and may not check for the status of the vehicle for long periods of time during the journey. It would be desirable to have positional time series data from these users during the full journey. In order to achieve this, according to an embodiment the system uses a "poke" protocol, wherein the server can request the user to upload the data. For this purpose, the server uses the set of candidate users who are possibly inside the vehicle and at any given time, decides to poke a subset of candidate users of each vehicle, and requests for new uploads. These uploads are then received by the central server and used to extend the real time status of the vehicle. Based on the upload, the server may also decide that some set of users are not inside the particular vehicle, and thereby removes these users as candidate users for that vehicle.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for determining *a* real-time location of a vehicle [using] *in which a user associated with* a mobile device [without using GPS or Internet for the user travelling inside the vehicle, wherein] *is travelling* the method comprising [the step of]:

[allowing the user to select manually or automatically finding the vehicle in which the user is travelling from a predetermined set of vehicles using the mobile device;

characterized in that the method further includes] storing*, in the mobile device,* [the set of predetermined vehicles along with the] route information for [each] *the* vehicle[in the mobile device]*, the route information including route*;

[collecting and] storing [location] *, in the mobile device, respective locations* of *a* plurality of [relevant] cell towers [in the mobile device] , *the plurality of cell towers including a first cell tower*;

receiving, *by the mobile device,* information [of the connected] *from the first* cell tower, *the information including* [in the form of] a cell [tower-id] *tower identifier associated with the first cell tower*;

determining, *by the mobile device,* the location of the [connected] *first* cell tower by mapping the [received] cell [tower-id] *tower identifier* with the *location of the first cell tower* stored [locations of the relevant cell towers] *in the mobile device, without using a global positioning system (GPS) or being connected to Internet*;

projecting, *by the mobile device,* the location of the [connected] *first* cell tower onto the [selected] route *associated with the route information* [and visually displaying on the mobile device];[and]

determining, *by the mobile device,* the real-time location of the vehicle based on the *projection of the* location of the [connected] *first* cell tower *onto the route, without using the GPS or being connected to the Internet; and*

*displaying, by the mobile device, the real-time location of the vehicle*.

2. The method as claimed in claim 1, wherein [the determination of real-time location of the vehicle includes]:

projecting, *by the mobile device,* the location of the [connected] *first* cell tower onto the [selected]route [to obtain] *comprises obtaining* a closest point *on the route to the first cell tower*; and determining, *by the mobile device,* the *real-time location of the* vehicle [location by] *comprises* using the obtained closest point.

3. The method as claimed in claim 2, wherein determining, *by the mobile device,* the real-time vehicle location further includes:

finding *a* distance of the closest point [in] *on* the route of the [selected] vehicle from the [connected] *first* cell tower;

comparing the distance with a [pre-determined] threshold value;

[concluding the connected cell tower is near the closest point in the route of the selected vehicle when the distance is within the pre-determined threshold value and] *when the distance is less than the threshold value,* using the closest point to estimate the real-time location of the vehicle; and

[concluding the connected cell tower is far from the closest point in the selected route when the distance exceeds the pre-determined threshold and thereby connecting the mobile device to another cell tower] *when the distance is greater than the threshold value, not using the closest point to estimate the real-time location of the vehicle*.

4. The method as claimed in claim 1, wherein the route information of the vehicle [consists of] *includes a* geographical path travelled *to be* by the vehicle [along with] *and* arrival and/or departure times of the vehicle [in] *with respect to* a finite set of points along the route.

5. The method as claimed in claim 1, wherein [the relevant cell towers includes] *storing, in the mobile device, the respective locations of the plurality of cell towers, comprises limiting storing of the plurality of cell towers to* cell towers [available along the route of the user's home location and frequently travelled] *which are near a home of the user and which are near* areas [and wherein the location of the relevant cell towers are collected and stored in the mobile device] *frequently travelled to by the user*.

6. The method as claimed in claim 1, [the determined location of the user is used for estimating delay of the vehicle and] *further comprising:* estimating [the] arrival and/or departure times of the vehicle at [specific] points along the route *based on the real-time location of the vehicle; and*

*estimating a delay of the vehicle with respect to one or more of the points along the route based on the estimated arrival and/or departure times of the vehicle at the one or more points along the route*.

7. A method for providing the real-time location of [the] *a* vehicle [for people] *to a person located* outside the vehicle using [the] information of [the] users travelling inside the vehicle, [wherein] the method comprising [the step of]:

[automatically uploading] *receiving, by a central server,* a list of [connected] cell tower information *automatically uploaded* from a [set] *plurality* of candidate users [to a central server,] *potentially travelling inside the vehicle;*

[characterized in that the method further includes,]

converting, *by the central server,* [the connected] cell tower information [from a candidate user] *from the list of cell tower information which is associated with a first candidate user from the plurality of candidate users* to a *first* positional time series [data.] *data;* representing, *by the central server,* the real-time location of the vehicle as [another] *a second* positional time series [data,] *data;* comparing, *by the central server,* the *first* positional time series data [of the user] with *the second* positional time series data [of the vehicle] to determine if the *first candidate* user is travelling inside the [vehicle,] *vehicle;*

*when the first candidate user is determined to be travelling inside the vehicle,* using, *by the central server,* the *first* positional time series data [of the user classified inside the vehicle] to extend the *second* positional time series data [of the vehicle, and thereby] *to* update the [real] *real*-time location of the [vehicle.] *vehicles; and* providing, *by the central server via Internet,* the [real] *updated real*-time location of the vehicle to [the] *a* mobile device [of people] *associated with the person located* outside the vehicle [via internet].

8. The method as claimed in claim 7, [wherein] *further comprising determining* the [candidate set of users for a vehicle is determined] *plurality of candidate users* based on [clues such as the user explicitly mentioning that he/she is] *users providing an input to an interface that they are* travelling inside [that] *the* vehicle, *based on users who* [or when the user is known to] have a booking in the vehicle, or [when the user does] *based on users providing* a real-time status of the vehicle.

9. The method as claimed in claim 7, wherein [a] *the* cell tower information [of a candidate user consists of the cell-tower id] *from the list of cell tower information which is associated with the first candidate user includes a cell tower identifier* of a [cell-tower] *cell tower* and a timestamp denoting [the] *a* time at which the *first candidate* user [got] *became* connected to the [particular cell-tower] *cell tower*.

10. The method as claimed in claim 7, wherein the *first* positional time series data [for a candidate user] is generated by [resolving cell-tower] *converting the cell tower* information into a series of locations [consisting of] *including* latitude and longitude *information* at different points in [time,] *time*.

11. The method as claimed in claim 7, wherein the *second* positional time series data [of a vehicle consists of] *includes* a series of locations in [the] *a* form of latitude and longitude *information* at one or more [point] *points* in [time,] *time.*

12. The method as claimed in claim 7, [wherein] *further comprising requesting, by* the *central* server, [may request from] one or more *of the plurality of* candidate users to upload [the recent cell-tower] *cell tower* information.

*13. The method as claimed in claim 1, further comprising:*

*storing, in the mobile device, route information for a plurality of vehicles, the plurality of vehicles including the vehicle and the route information including the route information for the vehicle; and*

*identifying, using the mobile device, the vehicle as a vehicle in which the user associated with the mobile device is traveling.*

*14. The method as claimed in claim 13, wherein identifying, using the mobile device, the vehicle as the vehicle in which the user associated with the mobile device is traveling comprises:*

*receiving a selection of the vehicle from the plurality of vehicles, via a manual input from the user; or*

*automatically selecting, by the mobile device, the vehicle from the plurality of vehicles.*

*15. A mobile device comprising*

*a display;*

*one or more memory devices configured to store instructions; and*

*one or more processors configured to execute the instructions to perform operations, the operations comprising:*

*storing, in the one or more memory devices, route information for a vehicle in which a user associated with the computing device is travelling the route information including a route;*

*storing, in the one or more memory devices respective locations of a plurality of cell towers, the plurality of cell towers including a first cell tower;*

*receiving information from the first cell tower, the information including a cell tower identifier associated with the first cell tower;*

*determining the location of the first cell tower by mapping the cell tower identifier with the location of the first cell tower stored in the mobile device, without using a global positioning system (GPS) or being connected to Internet;*

*projecting the location of the first cell tower onto the route associated with the route information;*

*determining the real-time location of the vehicle based on the projection of the location of the first cell tower onto the route, without using the GPS or being connected to the Internet; and*

*providing for presentation on the display, a real-time location of the vehicle.*

*16. The mobile device as claimed in claim 15, the operations further comprising:*

*projecting, by the mobile device, the location of the first cell tower onto the route comprises obtaining a closest point on the route to the first cell tower; and*

*determining, by the mobile device, the real-time location of the vehicle comprises using the obtained closest point.*

*17. The mobile device as claimed in claim 16, wherein determining, by the mobile device, the real-time vehicle location further includes:*

*finding a distance of the closest point on the route of the vehicle from the first cell tower;*

*comparing the distance with a threshold value;*

*when the distance is less than the threshold value, using the closest point to estimate the real-time location of the vehicle; and*

*when the distance is greater than the threshold value, not using the closest point to estimate the real-time location of the vehicle.*

*18. The mobile device as claimed in claim 15 wherein the route information of the vehicle includes a geographical path travelled to be bv the vehicle and arrival and/or departure times of the vehicle with respect to a finite set of points along the route.*

*19. The mobile device as claimed in claim 15, wherein storing, in the mobile device, the respective locations of the pluralitv of cell towers, comprises limiting storing of the pluralitv of cell towers to cell towers which are near a home of the user and which are near areas frequentlv travelled to bv the user.*

*20. The mobile device as claimed in claim 15, the operations further comprising:*

*estimating arrival and/or departure times of the vehicle at points along the route based the real-time location of the vehicle; and*

*estimating a delay of the vehicle with respect to one or more of the points along the route based on the estimated arrival and/or departure times of the vehicle at the one or more points along the route.*

* * * * *